US010324608B2

(12) United States Patent
Daly et al.

(10) Patent No.: US 10,324,608 B2
(45) Date of Patent: Jun. 18, 2019

(54) SOCIAL BALANCER FOR INDICATING THE RELATIVE PRIORITIES OF LINKED OBJECTS

(71) Applicant: INTERNATIONAL BUSINESS MACHINES CORPORATION, Armonk, NY (US)

(72) Inventors: Elizabeth M. Daly, Monkstown (IE); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/005,579

(22) Filed: Jan. 25, 2016

(65) Prior Publication Data

US 2016/0139792 A1 May 19, 2016

Related U.S. Application Data

(63) Continuation of application No. 14/153,178, filed on Jan. 13, 2014, now Pat. No. 9,292,616.

(51) Int. Cl.
*G06F 17/30* (2006.01)
*G06F 7/00* (2006.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
CPC .................................................. G06F 17/3089
(Continued)

(56) References Cited

U.S. PATENT DOCUMENTS 5,615,347 A 3/1997 Davis et al.
6,014,664 A 1/2000 Fagin et al.
(Continued)

FOREIGN PATENT DOCUMENTS

WO 2013074750 A1 5/2013

OTHER PUBLICATIONS

Beavers, "Typicality Effects and Resilience in Evolving Dynamic Associative Networks," Complex Adaptive Systems—Resilience, Robustness, and Evolvability: Papers from the Aaai Fall Symposium (FS-10-03), Nov. 11-13, 2010, p. 8-15, Arlington, Virginia, USA.
(Continued)

*Primary Examiner* — Pavan Mamillapalli
(74) *Attorney, Agent, or Firm* — Michael O'Keefe

(57) ABSTRACT

A method and system for indicating a priority of a first linked node and a second linked node within a plurality of linked nodes associated with an electronically interactive social relations service. The method may include assigning a weight to the first linked node within the plurality of linked nodes. The method may also include assigning a weight to the second linked node within the plurality of linked nodes. Additionally, the method may include determining an adjustment of the weight of the first linked node within the plurality of linked nodes. The method may further include adjusting the weight of the second linked node based on the determining of the adjustment of the weight of the first linked node, the adjusting of the weight of the second linked node corresponding to a link strength of the second link node relative to the first link node.

14 Claims, 7 Drawing Sheets

(51) Int. Cl.
*G06F 3/0484* (2013.01)
*G06F 16/958* (2019.01)
*G06F 16/9535* (2019.01)
*G06F 16/2457* (2019.01)
*G06F 3/0482* (2013.01)

(52) U.S. Cl.
CPC ...... *G06F 16/24578* (2019.01); *G06F 16/958* (2019.01); *G06F 16/9535* (2019.01)

(58) Field of Classification Search
USPC .................................................... 707/748
See application file for complete search history.

(56) References Cited

U.S. PATENT DOCUMENTS

| | | | |
|---|---|---|---|
| 6,169,534 B1* | 1/2001 | Raffel | G06Q 10/10 345/473 |
| 6,750,889 B1 | 6/2004 | Livingston | |
| 6,850,891 B1 | 2/2005 | Forman | |
| 6,922,816 B1 | 7/2005 | Amin et al. | |
| 7,493,320 B2* | 2/2009 | Canright | G06F 16/951 |
| 8,306,922 B1* | 11/2012 | Kunal | G06Q 50/01 705/319 |
| 8,498,994 B2 | 7/2013 | Prabaker et al. | |
| 8,736,612 B1* | 5/2014 | Goldman | G06Q 50/01 345/440 |
| 9,031,951 B1* | 5/2015 | Baluja | G06F 16/437 707/737 |
| 2002/0105548 A1* | 8/2002 | Hayton | G06F 8/38 715/764 |
| 2003/0120640 A1 | 6/2003 | Ohta et al. | |
| 2003/0130887 A1* | 7/2003 | Nathaniel | G06Q 10/02 705/14.73 |
| 2006/0122974 A1* | 6/2006 | Perisic | G06F 16/40 |
| 2009/0293019 A1* | 11/2009 | Raffel | G06F 3/04847 715/833 |
| 2010/0268830 A1* | 10/2010 | McKee | G06Q 10/10 709/228 |
| 2011/0105143 A1* | 5/2011 | Harple | G06F 16/29 455/456.1 |
| 2011/0167115 A1* | 7/2011 | Gilbert | G06Q 10/00 709/204 |
| 2011/0179025 A1* | 7/2011 | Chuang | G06F 16/9535 707/728 |
| 2012/0072475 A1* | 3/2012 | Morrison | G06F 17/10 708/200 |
| 2012/0102013 A1* | 4/2012 | Martini | G06F 16/9535 707/706 |
| 2012/0137367 A1 | 5/2012 | Dupont et al. | |
| 2012/0221563 A1* | 8/2012 | De | G06O 10/06 707/728 |
| 2012/0223951 A1 | 9/2012 | Dunn et al. | |
| 2013/0132861 A1 | 5/2013 | Kienzle et al. | |
| 2013/0151950 A1 | 6/2013 | McEvilly et al. | |
| 2014/0115010 A1* | 4/2014 | Seth | G06Q 50/01 707/798 |
| 2014/0189530 A1* | 7/2014 | Anand | H04L 65/403 715/753 |
| 2015/0199369 A1 | 7/2015 | Daly et al. | |
| 2015/0242755 A1 | 8/2015 | Gross | |
| 2015/0269530 A1* | 9/2015 | Work | G06Q 10/00 705/319 |

OTHER PUBLICATIONS

Frick, "MAPSAT Curriculum Dashboard: Connecting the dots for STEM Careers," NSF Proposal Submitted to ITEST, Apr. 11, 2008, 19 Pages.

Qiang, "Study about the Message Spreading Mechanism in Network Communities," International Conference on Information Management, Innovation Management and Industrial Engineering, 2011, p. 157-160, IEEE Computer Society.

Xiang et al., "Modeling Relationship Strength in Online Social Networks," WWW 2010, Apr. 26-30, 2010, p. 981-990 ACM, Raleigh, North Carolina, USA.

* cited by examiner

SOCIAL BALANCER FOR INDICATING THE RELATIVE PRIORITIES OF LINKED OBJECTS

FIELD OF THE INVENTION

The present invention relates generally to the field of social networking using a computer on a communication network, and more particularly to indicating priorities of linked nodes associated with a social software product or a social network.

BACKGROUND

A social networking service is an online service, platform, or site that focuses on facilitating the building of social networks or social relations among people who, for example, share interests, activities, backgrounds, or real-life connections. A social network service consists of a representation of each user, i.e., a profile, the user's social links, and a variety of additional services. Most social network services are web-based and provide means for users to interact over the Internet, such as e-mail and instant messaging. Social networking sites allow users to share ideas, activities, events, and interests within their individual networks.

Social media depends mainly on user driven content and as a result, large amounts of data flow through these social network channels daily. Currently, a user may be able to designate groups, circles, etc.; however, it may be difficult for the user to specify metrics of priority, such as adjusting the priorities of different persons or objects associated with a social software product or a social network.

SUMMARY

An embodiment of the invention, includes a method for indicating a priority of a first linked node and a second linked node within a plurality of linked nodes associated with an electronically interactive social relations service is provided. The method may include assigning a weight to the first linked node within the plurality of linked nodes. The method may also include assigning a weight to the second linked node within the plurality of linked nodes. Additionally, the method may include determining an adjustment of the weight of the first linked node within the plurality of linked nodes. The method may further include adjusting the weight of the second linked node based on the determining of the adjustment of the weight of the first linked node, the adjusting of the weight of the second linked node corresponding to a link strength of the second link node relative to the first link node.

Another aspect of the invention includes, a computer system for indicating a priority of a first linked node and a second linked node within a plurality of linked nodes associated with an electronically interactive social relations service is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include assigning a weight to the first linked node within the plurality of linked nodes. The method may also include assigning a weight to the second linked node within the plurality of linked nodes. Additionally, the method may include determining an adjustment of the weight of the first linked node within the plurality of linked nodes. The method may further includes adjusting the weight of the second linked node based on the determining of the adjustment of the weight of the first linked node, the adjusting of the weight of the second linked node corresponding to a link strength of the second link node relative to the first link node.

Another aspect of the invention includes, a computer program product for indicating a priority of a first linked node and a second linked node within a plurality of linked nodes associated with an electronically interactive social relations service is provided. The computer program product may include one or more computer-readable storage devices and program instructions stored on at least one of the one or more tangible storage devices, the program instructions executable by a processor. The computer program product may include program instructions to assign a weight to the first linked node within the plurality of linked nodes. The computer program product may also include program instructions to assign a weight to the second linked node within the plurality of linked nodes and program instructions. Additionally, the computer program product may determine an adjustment of the weight of the first linked node within the plurality of linked nodes. The computer program product may further include program instructions to adjust the weight of the second linked node based on the determining of the adjustment of the weight of the first linked node, the adjusting of the weight of the second linked node corresponding to a link strength of the second link node relative to the first link node.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
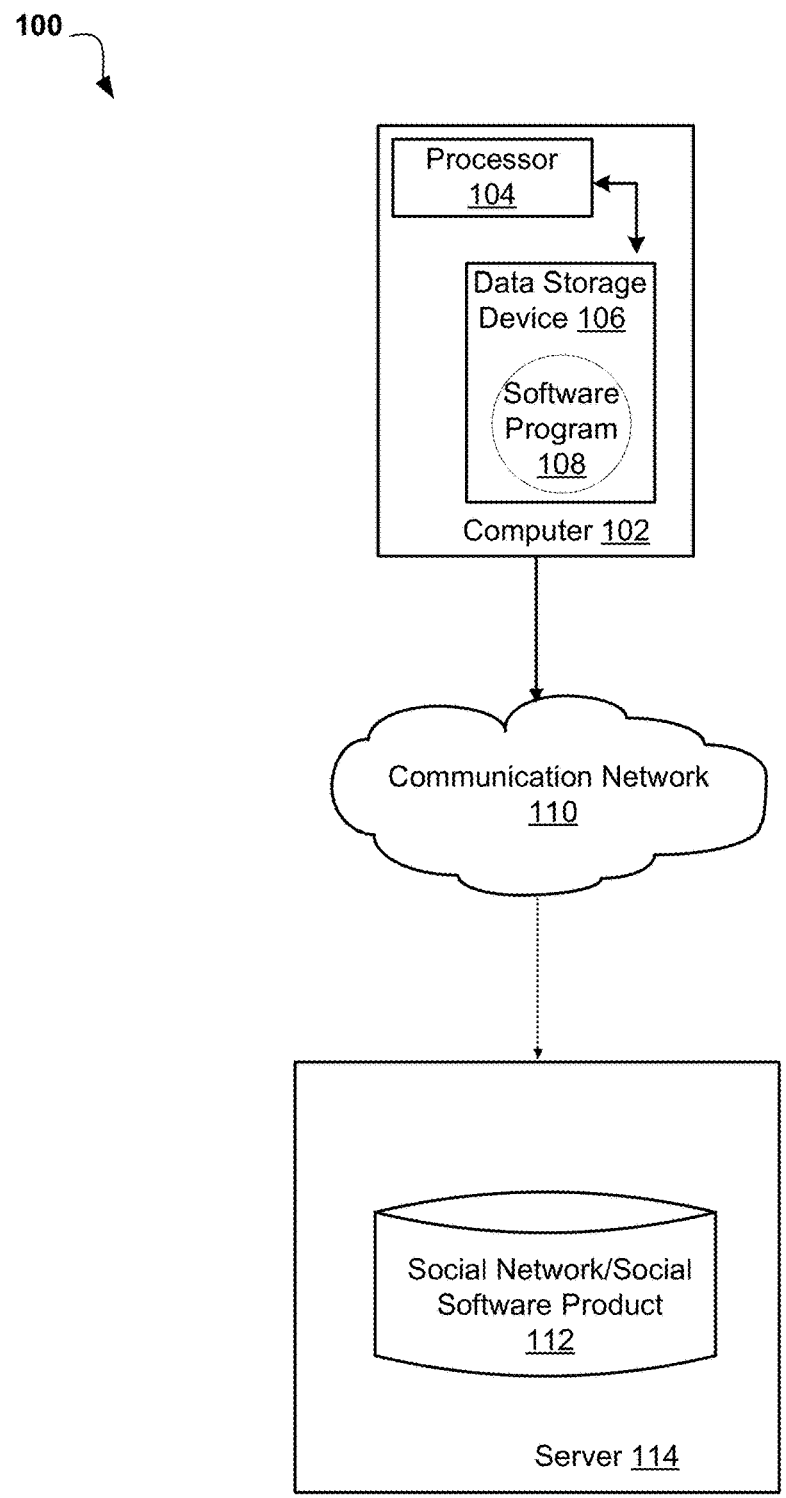
FIG. 1 is a block diagram which illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of social networking using a computer on a communication network, and more particularly to indicating priorities of linked nodes (e.g. objects) associated with a social software product or a social network. The following described exemplary embodiments provide a system, method and program product for indicating the relative priorities of linked nodes (e.g. objects) associated with a social software product or a social network.

As previously described, social media depends mainly on user driven content. As a result, large amounts of data flow through these social network channels daily. Currently, a user may be able to designate groups, circles, etc.; however, it may be difficult for the user to specify metrics of priority, such as adjusting the priorities of different persons or objects associated with a social software product or a social network. As such, it may be advantageous, among other things for a user to be able to indicate the relative priorities of linked nodes (e.g. objects) or to specify metrics (i.e., weights) of priority, such as adjusting the priorities of different persons or objects associated with a social software product or a social network.

According to at least one embodiment of the present invention, a graphical user interface (GUI) may be used to adjust the relative priorities (i.e., weights) among a set of partially linked resources (i.e., nodes) associated with a social software product or a social network. For example, the resources may include people in a social network, whose strength of linkage may be determined from the tie-strength in the social network. Another example may be objects in a social software application, whose strength of linkage may be determined from the number of people-in-common who have accessed each object, such as photos, movies, files, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program product for indicating the relative priorities of linked nodes (e.g. objects) in a social software product or a social network.

According to at least one embodiment of the present invention, a graphical user interface (GUI) similar to that of a graphic equalizer used in audio technology may be implemented where the relative volume of different frequency bands may be adjusted. As such, the GUI may be used to adjust the priorities of messages to or from different persons or objects associated with a social network. Similarly, the GUI may be used to adjust a preferred sequence of people to be asked for assistance, such as in answering a question. Additionally, the GUI may be used to adjust the default order in which members of a social network are displayed. Furthermore, the GUI may be used to adjust the relative priorities of persons or objects in a recommendation algorithm; to provide weighting coefficients for complex searches; or to re-sort search results.

Referring to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a social network 112, a server 114, and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with social network/social software product 112 running on server computer 114 via the communications network 110. The communications network 110 may include connections, such as wire, wireless communication links, or fiber optic cables. As will be discussed with reference to FIG. 7, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of accessing a social network.

As previously described, the client computer 102 may access an electronically interactive social relations service (i.e., social network/social software product 112), running on server computer 114 via the communications network 110. For example, a user using an application program 108 (e.g., Firefox®) (Firefox and all Firefox-based trademarks and logos are trademarks or registered trademarks of Mozzilla and/or its affiliates) running on a client computer 102 may connect via a communication network 110 to one of their social network accounts/social software product 112 which may be running on server computer 114.

Figure 2:
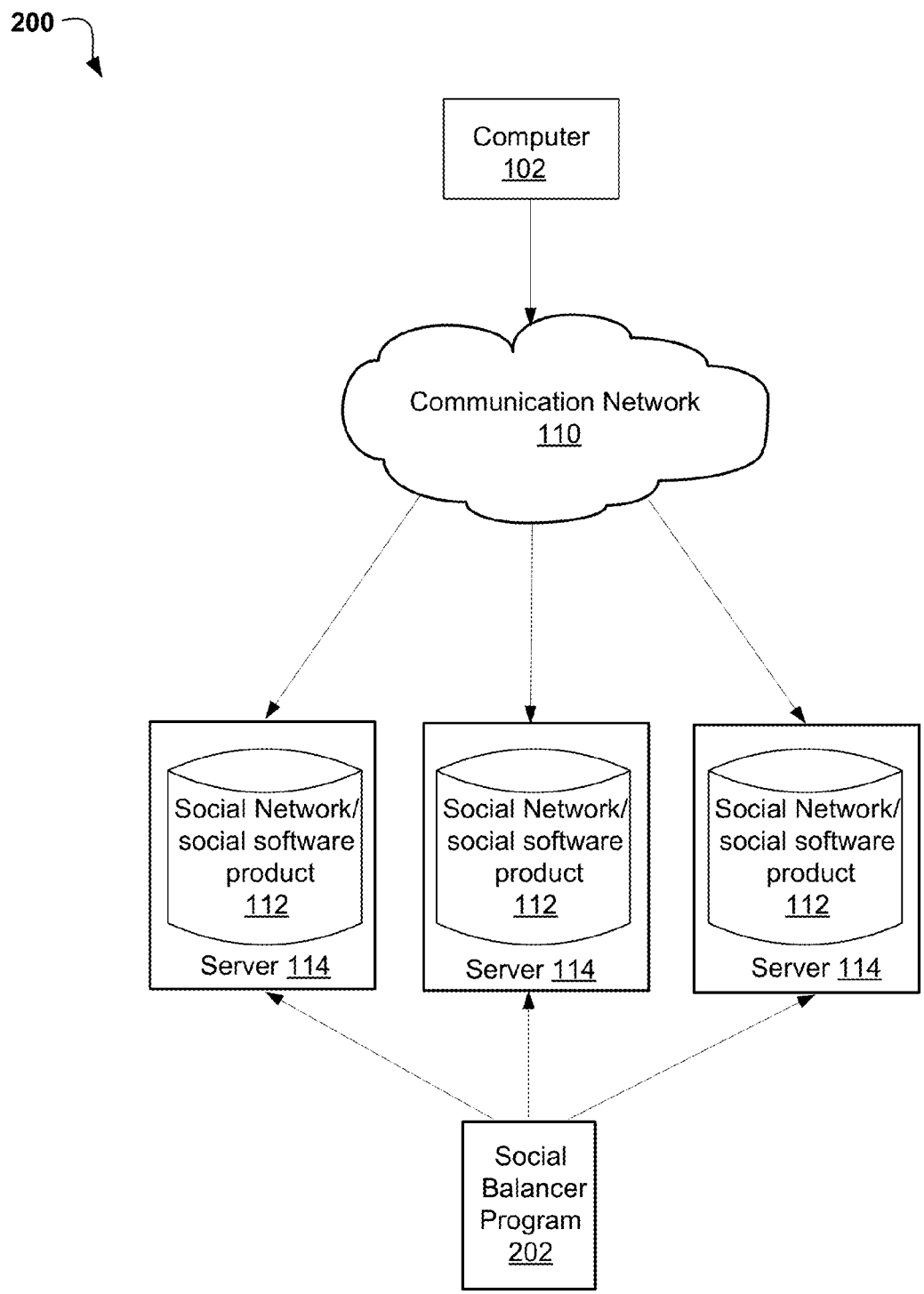
FIG. 2 illustrates a networked computer environment with an exemplary program to indicate the relative priorities of linked nodes associated with a social software product or a social network according to at least one embodiment.

Referring now to FIG. 2, a networked computer environment with an exemplary social balancer program in accordance with one embodiment is depicted. Client computer 102 may communicate via a communication network 110 with one or more electronically interactive social relations services (i.e., social networks/social software products 112), such as Twitter® (Twitter and all Twitter-based trademarks and logos are trademarks or registered trademarks of Twitter and/or its affiliates) or Facebook® (Facebook and all Facebook-based trademarks and logos are trademarks or registered trademarks of Facebook and/or its affiliates) which may be running on a server computer 114. Indicating the relative priorities of linked nodes (e.g. objects) on a communications network 110 associated with an electronically interactive social relations service (i.e., a social software product or a social network 112) communicating on the communications network 110 in accordance with at least one embodiment may be implemented as a social balancer program 202 to social network/social software product 112 which may be running on server computer 114.

For example, the embodiment may be implemented as a social balancer program 202 that interacts with a social network/social software product 112 (i.e. the main application) which may be running on server 114 to indicate priorities of linked nodes (e.g. objects) associated with a social software product or a social network 112. The social balancer program 202 may, for example, be displayed to the user using a graphical user interface (GUI) which may display a set of familiar nodes (e.g. objects, files, people, etc.). As such, with respect to people, the GUI may display a social balancer including a set of sliders corresponding to each person being displayed. Similar to adjusting the frequency in audio technology, each slider may control a relative priority based on an assigned weight of the associated person. According to one implementation, the user may increase the relative priority of a person by moving the slider higher for a particular person. The indication of priorities of linked nodes (e.g. objects) associated with a social software product or a social network as performed by social balancer program 202 interacting with social network/social software product 112 which may be running on server computer 114 is explained in more detail below with respect to FIG. 3.

Figure 3:
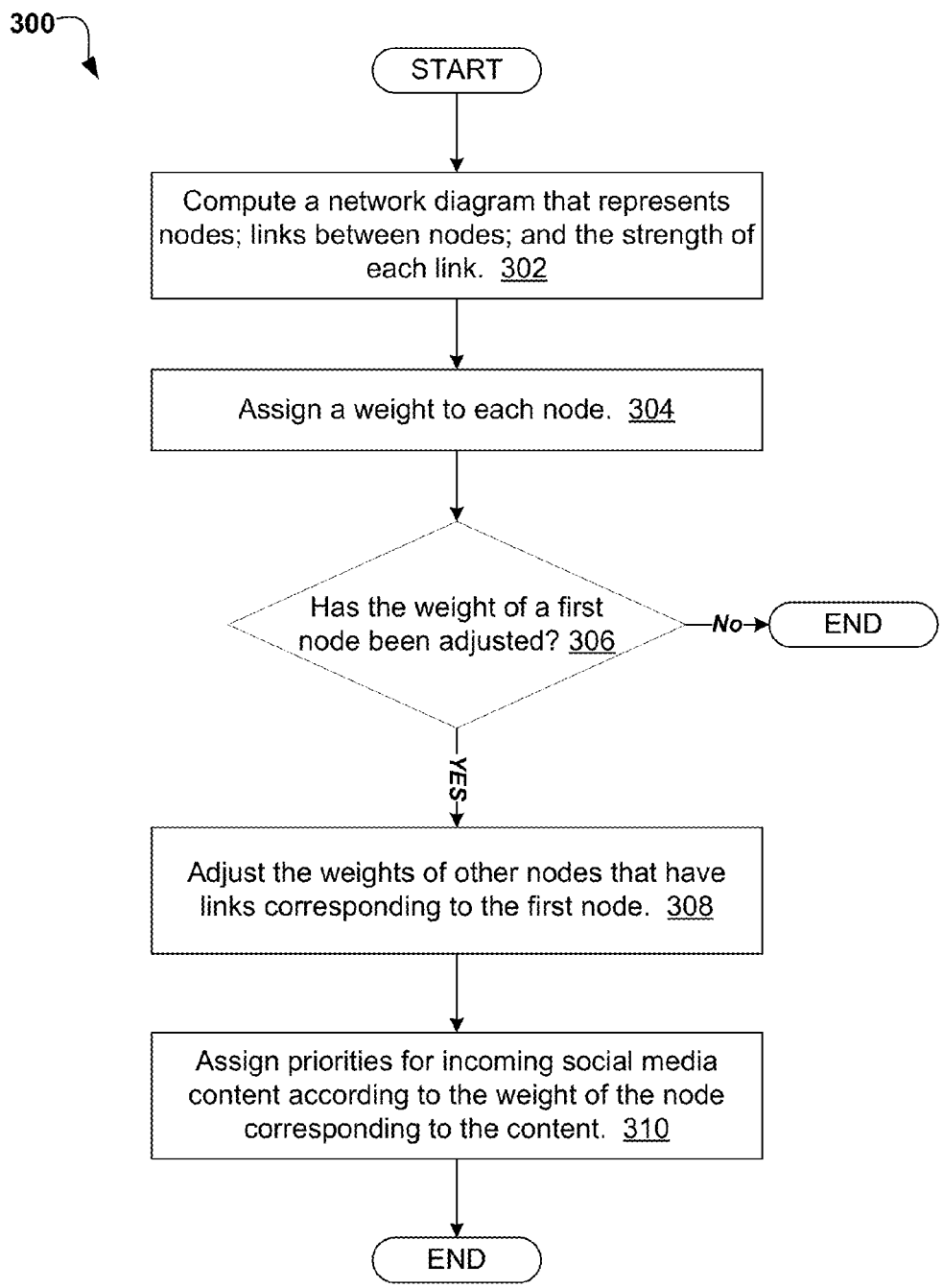
FIG. 3 is an operational flowchart illustrating the steps carried out by a program to indicate the relative priorities of linked nodes associated with a social software product or a social network according to at least one embodiment.

Referring now to FIG. 3, an operational flowchart illustrating the steps carried out by a social balancer program 202 (FIG. 2) to indicate the relative priorities of linked nodes (e.g. objects) on a communications network 110 (FIG. 2) associated with an electronically interactive social relations service (i.e., a social software product or a social network 112 (FIG. 2)) according to at least one embodiment is depicted. At 302, using current methods, a network diagram (or graph) is computed that represents nodes (e.g., objects, people, files, etc.); links between nodes; and the strength of each link. For example, with respect to a social network of people, the nodes may represent the people. The links between the linked nodes may be determined by the manner that the people are related to each other. For example, the people may be co-workers. The strength of each link may be determined by the number of interactions between the people. As such, the more interactions two people have with each other then the greater the link strength may be between those two people. Another example may be a "friends" network, where the link strength may be determined by whether people are friends or not friends without assessing the level of friendship. Furthermore, according to one implementation, two people may not be directly related to each other, but it may be determined that they are in fact related due to a common link (i.e., a relationship) with a common person they are both linked to. For example, person A may be linked to person B since they work on a project together and person B may be linked to person C because they work on a different project together. As such, person A and person C may not be directly linked to each other, but they do have a common linkage since they are both linked to B.

According to one implementation, some social networks may support varying tie-strengths (i.e., link strength between linked nodes) which may be a degree of association (i.e., link) between nodes. Therefore, the link strength may be a degree of association between a first linked node and a second linked node and a number of intervening nodes in a shortest path that connects the first linked node and the second linked node. As such, the association between two nodes may have, for example, a strength of 1.0 if the two nodes were directly connected. However, if the two nodes did not have a direct connection to one another, then in one embodiment, the number of intervening nodes (i.e., geodesic distance) in the shortest path that connects two nodes may be calculated and the propagation strength may be divided in half for each step. For example, A may be linked to B. B may be linked to C. C may be linked to D. Therefore, the propagation strength from A to B may be 1.0. Furthermore, since the propagation strength is symmetrical, the propagation strength from B to A may also be 1.0. By contrast, since the propagation strength from A to C has to go through B, the propagation strength may be 1.0/2=0.5. Similarly, the propagation strength from A to D may be (1.0/2)/2=0.25.

Then at 304, a weight may be assigned to each node. Weights may be assigned manually, or by algorithm. For example, a user may review a list of friends and the user may indicate which friends are most important. With respect to an algorithmic example, one implementation may review the user's communication history (i.e., email, instant messaging (IM), etc.) and assign a weight based on how often the user initiated a message to each person.

Next, at 306, it is determined whether the weight of a first node has been adjusted. For example, according to one implementation, the user may adjust a slider in an upward motion corresponding to a friend to indicate that the friend is more important than the other friends displayed. If at 306, it is determined that the weight of a first node has not been adjusted, then the program terminates. However, if at 306, it is determined that the weight of a first node has been adjusted then at 308, the weights of the other nodes that have links corresponding to the first node are adjusted according to the other nodes' link strength to the first node. For example, in one implementation, if a slider corresponding to a friend is adjusted in an upward motion, then the sliders corresponding to the other friends that have a strong link strength to the adjusted friend, may be increased accordingly as well.

At 310, the weight of the node (i.e., the relative priority) is applied to an incoming social media content in order to prioritize the incoming social media content. As such, according to one exemplary embodiment, priorities for incoming social media content are assigned according to the weight of the node corresponding to the incoming social media content. For example with respect to one implementation, for a plurality of incoming social media messages, a relative priority may be assigned to the plurality of incoming social media messages according to the weight of the node (i.e., person, in this example) who initiated the message. Similarly, according to another implementation, a preference-ordering or filtering (i.e., according to topics, categories, interests, etc.) for recipients of a new message may be specified. In another embodiment, an ordered list of recommended members of a team or working group may be created.

Embodiments of the present invention may be implemented on social software products as well as on social networking sites and services on the Internet. According to at least one implementation of the present embodiment, the GUI may display a set of familiar objects. For example, with respect to people, the GUI may display a social balancer including a set of sliders corresponding to each person being displayed. Similar to adjusting the frequency in audio technology, each slider may control the relative priority of the associated person. According to one implementation, the user may increase the relative priority of a person by moving the slider higher for a particular person.

Additionally, the present embodiment may be implemented in various formats, such as a list of people in which each person has an associated priority value. As such, the user may select a priority value field and overwrite its current value with a new value. The priority values for other people in the list may be adjusted in accordance with the steps previously illustrated in FIG. 3 describing the social balancer program 202 (FIG. 2).

Similarly, another implementation may be for each person to be associated with a displayed priority value as well as an "increment" button and a "decrement" button. As such, the user may adjust the displayed priority value by clicking on the buttons and the social balancer program 202 (FIG. 2) may then adjust the related priority values in accordance with the steps previously illustrated in FIG. 3.

Figure 4:
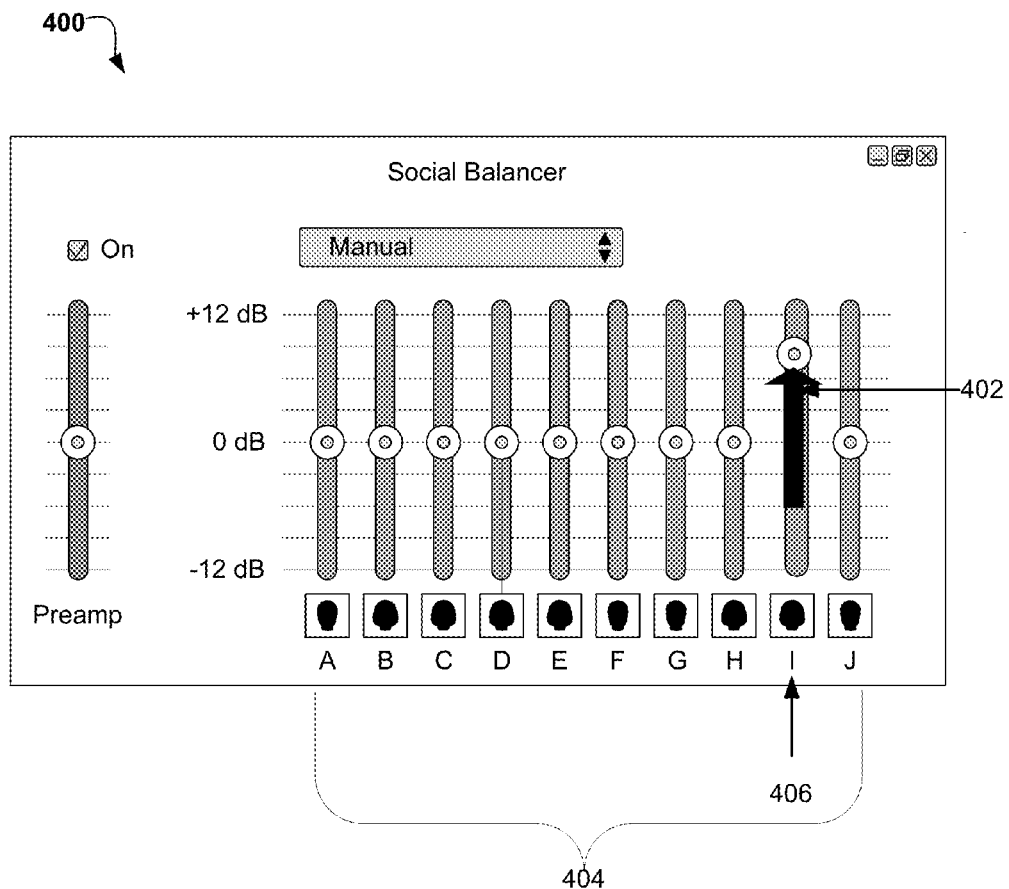
FIG. 4 illustrates a GUI according to at least one embodiment.

Referring now to FIG. 4, a GUI according to at least one embodiment is depicted. FIG. 4 illustrates the GUI 400 immediately after the user has increased the relative priority (i.e., moved the slider 406 in an upward motion) for a person 404. According to one implementation, a "result" may be produced based on the user moving the slider 402 either higher or lower for a particular person (i.e., "I" 406). The "result" is a set of priorities or weights where one set is assigned for each respective person. For example with respect to FIG. 4 previously described, the resulting priority or weight for "I" 406 would be higher than the priorities of weights for other people 404. An additional implementation may include the adjusting of the weights of other persons 404 according to their relative linkage to the adjusted person 406. Another implementation may include displaying a summary of linkages between persons 404, to help the user understand the outcome of each operation.

Although FIG. 4 illustrates persons as the data objects of interest, the same GUI 400 design may be used to adjust the relative priorities of tags in a social software system (i.e., an electronically interactive social relations service), or of search terms, or of files in a social file-sharing service (i.e., an electronically interactive social relations service). Furthermore, an extension of the described implementation may be used in any social-sharing service (i.e., an electronically interactive social relations service), such as searching for vacation destinations, or medical diagnoses. The present embodiments may be implemented with respect to a set of nodes (e.g. objects) and a set of linkages between pairs of the nodes (e.g. objects).

Figure 5:
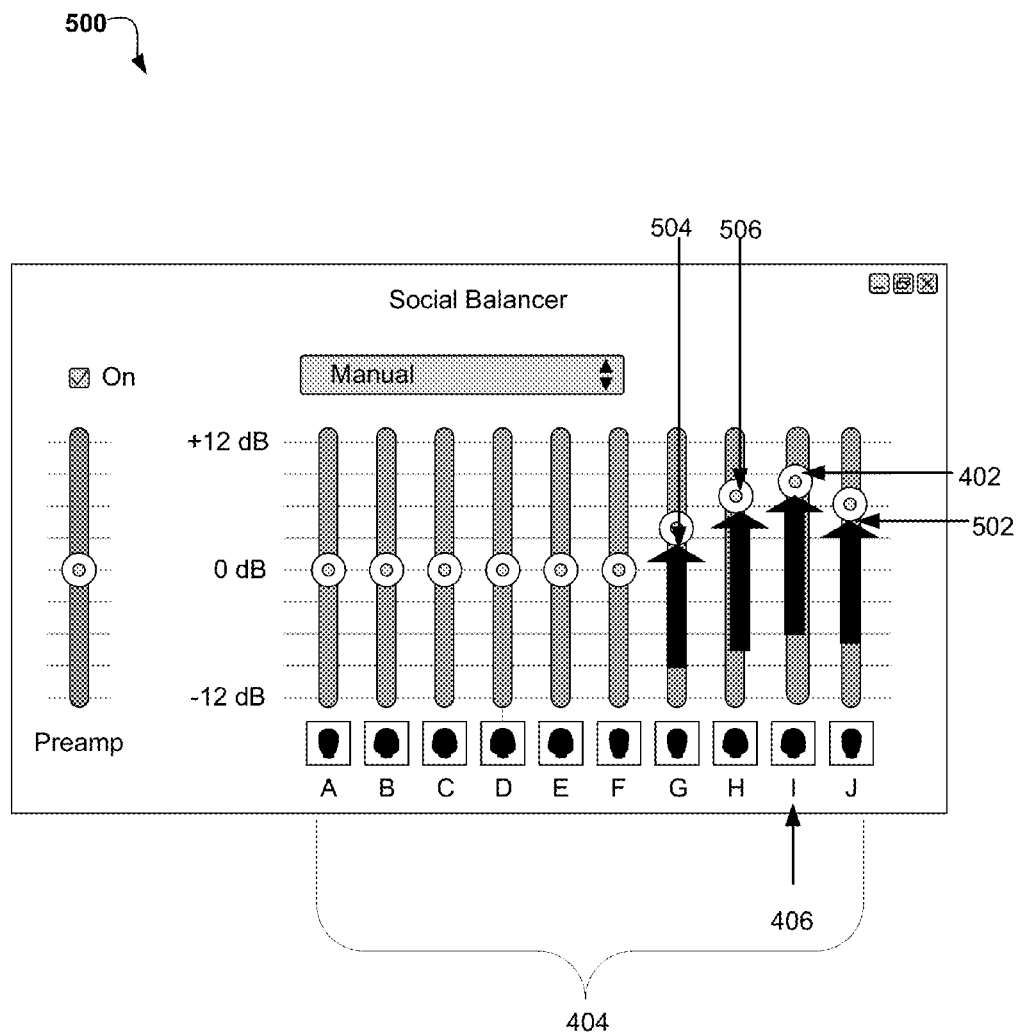
FIG. 5 illustrates a social balancer according to at least one embodiment.

Referring now to FIG. 5, a social balancer according to at least one embodiment is depicted. Some software implementations of graphic equalizers may allow the automatic adjustment of weights of related persons may be made. As such, the graphic equalizers may allow the user to link the adjustment for one frequency band in response to adjustments of another frequency band. For example, if the user increases the slider for the lowest frequency band, then the system may make corresponding, but smaller adjustments in the adjacent frequency bands.

Similarly, the social balancer may be implemented. For example, with respect to FIG. 5, there may be people displayed among a dimension of relatedness 404. Therefore, the people who are immediately adjacent to "I" 406 are most related to "I" 406. For example purposes only, the relative positions of the people immediately adjacent to "I" 406 may be "I"+1 502 and "I"−1 506. As such, the persons in positions "I"+2 and "I"−2 504 may be considered less related to "I" 406. This would continue for all the persons in increasing distances away from "I" 406. However, if the user adjusts "I's" 402 relative priority, then the system may cascade that adjustment to other people 404, in proportion to their relatedness to "I" 406.

Furthermore, unlike frequency bands, the relatedness among a group of persons may not be linear or monotonic. Therefore in one implementation, the system may add a feature to display the relative relatedness of persons as shown in FIG. 5.

Figure 6:
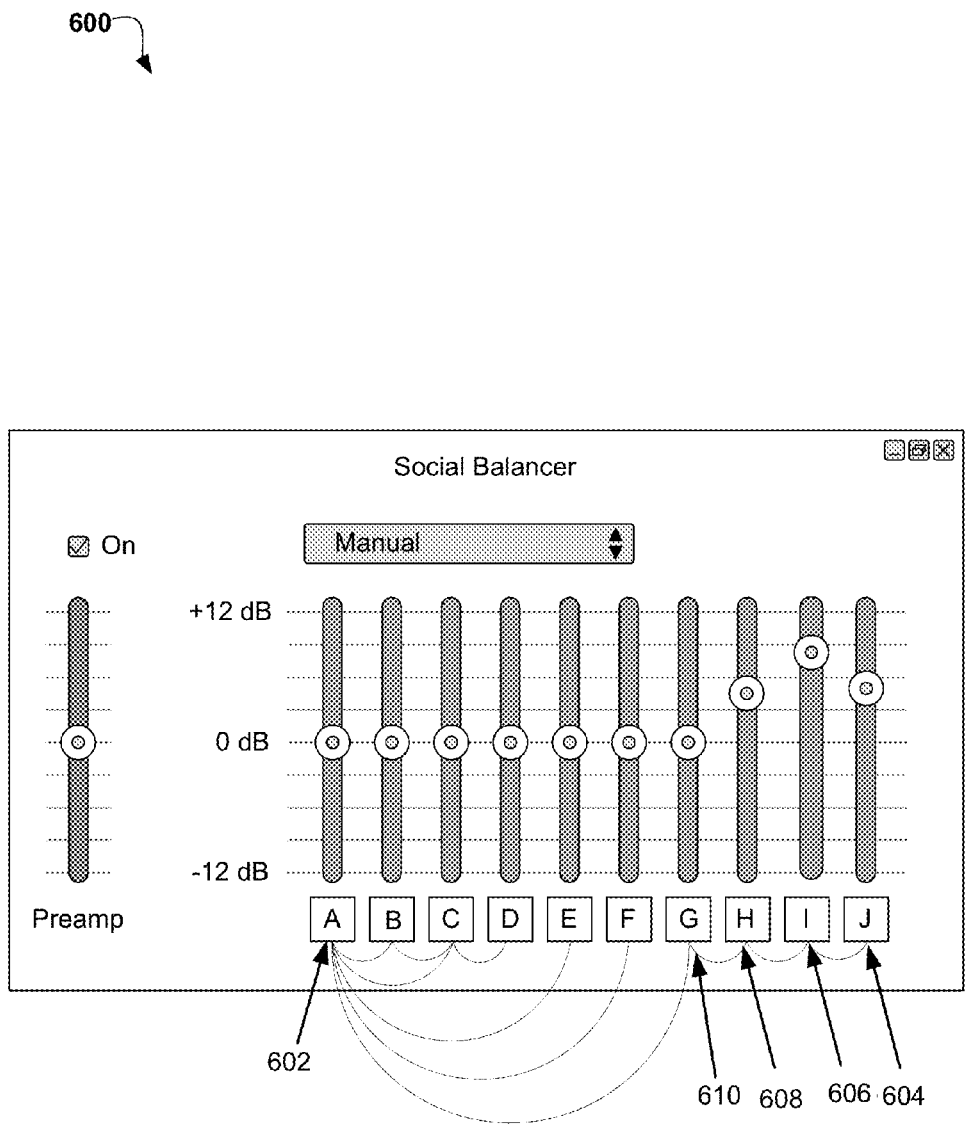
FIG. 6 illustrated a social balancer according to at least one embodiment.

Referring now to FIG. 6, a social balancer according to at least one embodiment is depicted. The arcs indicate that "J" 604 is directly related to two persons "I" 606 and H "608," and indirectly related to one more person "G" 610. By contrast "A" 602 (at the far left) has a more complex set of relationships. Therefore, if the user adjusts "A's" 602 priority, the system in one implementation may automatically adjust the priorities of the other persons in proportion to their degree of relatedness to "A" 602.

As previously explained, embodiments of the present invention may be applied to any types of nodes (e.g. objects) as long as it is possible to calculate their relatedness. Implementations have been described and depicted based on a common audio graphic equalizer technology which emphasizes a linear presentation of the nodes (e.g. objects) whose priority is to be adjusted. However, other graphical display implementations are possible.

Figure 7:
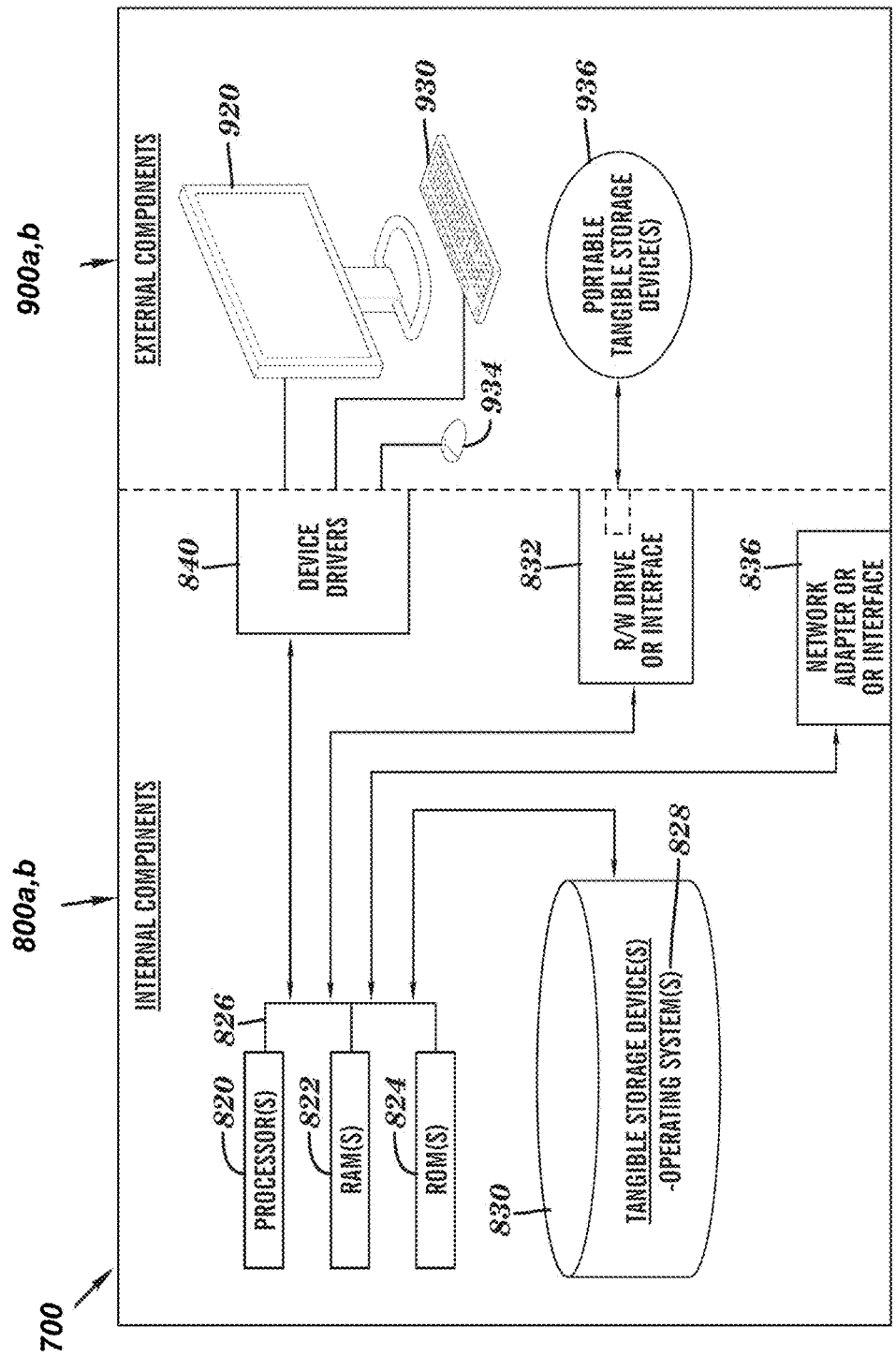
FIG. 7 is a block diagram of internal and external components of computers and servers depicted in FIG. 1 according to at least one embodiment.

FIG. 7 is a block diagram of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 114 (FIG. 1) include respective sets of internal components 800a, b and external components 900a, b illustrated in FIG. 7. Each of the sets of internal components 800a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828 and software program 108 (FIG. 1) in client computer 102 are stored on one or more of the respective computer-readable tangible storage devices 830 for execution by one or more of the respective processors 820 via one or more of the respective RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program 108, such as the social balancer program 202, can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless wi-fi interface cards, or 3G or 4G wireless interface cards or other wired or wireless communication links. The program 108 in client computer 102 and proxy 210 in network server 114 can be downloaded to client computer 102 from an external computer via a network (for example, the Internet, a local area network or other, wide area network) and respective network adapters or interfaces 836. From the network adapters or interfaces 836, the program 108 in client computer 102 and the social balancer program 202 are loaded into the respective hard drive 830. The network may comprise copper wires, optical fibers, wireless transmission, routers, firewalls, switches, gateway computers and/or edge servers.

Each of the sets of external components 900*a, b* can include a computer display monitor 920, a keyboard 930, and a computer mouse 934. External components 900*a, b* can also include touch screens, virtual keyboards, touch pads, pointing devices, and other human interface devices. Each of the sets of internal components 800*a, b* also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
generating, in a computer memory, a network diagram representing a plurality of linked nodes, wherein the plurality of linked nodes represents at least one object, at least one person, and at least one file, and wherein, when two or more linked nodes within the plurality of linked nodes represent two or more people, a strength link between each linked node is determined by a plurality of interactions between the two or more people;
a processor receiving, for a displayed graphical user interface (GUI), an adjusted weight of a first linked node of the plurality of linked nodes associated with a social relations service, wherein the adjusted weight is determined by a plurality of adjustment options comprising a plurality of sliders that can be moved upward and downward, an increment button and a decrement button each associated with a priority value field, and an overwrite option to select and overwrite a priority value field, wherein a subset of sliders in the plurality of sliders are each associated with an individual connected to a user as a friend within a user profile on the social relations service, and wherein a slider in the plurality of sliders is a graphic equalizer that allows the user to link an adjustment for one frequency band in response to adjustments of another frequency band;
in response to receiving the adjusted weight, the processor automatically generating and applying a weight to a second linked node of the plurality of linked nodes based on a relationship between the second linked node and the first linked node;
the processor generating a prioritized list of first social media content according to the adjusted weight of the first linked node;
the processor, concurrently to generating the prioritized list of first social media content, generating a prioritized list of second social media content according to the adjusted weight of the second linked node; and
generating and displaying a GUI based on the prioritized list of first social media content and the prioritized list of second social media content.

2. The method of claim 1, wherein said first social media content comprises a social media message from the first linked node.

3. The method of claim 1, wherein the relationship comprises a link strength of the second linked node relative to the first linked node.

4. The method of claim 1, further comprising:
further in response to said receiving, the processor automatically adjusting a weight of a third linked node of the plurality of linked nodes to a lesser extent than said automatically adjusting the weight of the second linked node, based on a lesser relationship between the third linked node and the first linked node than the relationship between the second linked node and the first linked node.

5. The method of claim 1, wherein the linked nodes represent tags in a social software system.

6. The method of claim 1, wherein the linked nodes represent search terms.

7. A computer system comprising a processor, a memory, and a computer readable hardware storage device having program instructions stored therein, said program instructions executable by the processor via the memory to implement a method comprising:
the processor generating, in a computer memory, a network diagram representing a plurality of linked nodes, wherein the plurality of linked nodes represents at least one object, at least one person, and at least one file, and wherein, when two or more linked nodes within the plurality of linked nodes represent two or more people, a strength link between each linked node is determined by a plurality of interactions between the two or more people;
the processor receiving, for a displayed graphical user interface (GUI), an adjusted weight of a first linked node of the plurality of linked nodes associated with a social relations service, wherein the adjusted weight is determined by a plurality of adjustment options comprising a plurality of sliders that can be moved upward and downward, an increment button and a decrement button each associated with a priority value field, and an overwrite option to select and overwrite a priority value field, wherein a subset of sliders in the plurality of sliders are each associated with an individual connected to a user as a friend within a user profile on the social relations service, and wherein a slider in the plurality of sliders is a graphic equalizer that allows the user to link an adjustment for one frequency band in response to adjustments of another frequency band;
in response to receiving the adjusted weight, the processor automatically generating and applying a weight to a second linked node of the plurality of linked nodes based on a relationship between the second linked node and the first linked node;
the processor generating a prioritized list of first social media content according to the adjusted weight of the first linked node;
the processor, concurrently to generating the prioritized list of first social media content, generating a prioritized list of second social media content according to the adjusted weight of the second linked node; and
the processor generating and displaying a GUI based on the prioritized list of first social media content and the prioritized list of second social media content.

8. The computer system of claim 7, wherein said first social media content comprises a social media message from the first linked node.

9. The computer system of claim 7, wherein the relationship comprises a link strength of the second linked node relative to the first linked node.

10. The computer system of claim 7, said method further comprising:
further in response to said receiving, the processor automatically adjusting a weight of a third linked node of the plurality of linked nodes to a lesser extent than said automatically adjusting the weight of the second linked node, based on a lesser relationship between the third linked node and the first linked node than the relationship between the second linked node and the first linked node.

11. A computer program product comprising a computer readable hardware storage device having program instructions stored therein, said program instructions executable by a processor of a computer system to implement a method comprising:
the processor generating, in a computer memory, a network diagram representing a plurality of linked nodes, wherein the plurality of linked nodes represents at least one object, at least one person, and at least one file, and wherein, when two or more linked nodes within the plurality of linked nodes represent two or more people, a strength link between each linked node is determined by a plurality of interactions between the two or more people;
the processor receiving, for a displayed graphical user interface (GUI), an adjusted weight of a first linked node of the plurality of linked nodes associated with a social relations service, wherein the adjusted weight is determined by a plurality of adjustment options comprising a plurality of sliders that can be moved upward and downward, an increment button and a decrement button each associated with a priority value field, and an overwrite option to select and overwrite a priority value field, wherein a subset of sliders in the plurality of sliders are each associated with an individual connected to a user as a friend within a user profile on the social relations service, and wherein a slider in the plurality of sliders is a graphic equalizer that allows the user to link an adjustment for one frequency band in response to adjustments of another frequency band;
in response to receiving the adjusted weight, the processor automatically generating and applying a weight to a second linked node of the plurality of linked nodes based on a relationship between the second linked node and the first linked node;
the processor generating a prioritized list of first social media content according to the adjusted weight of the first linked node;
the processor, concurrently to generating the prioritized list of first social media content, generating a prioritized list of second social media content according to the adjusted weight of the second linked node; and
the processor generating and displaying a GUI based on the prioritized list of first social media content and the prioritized list of second social media content.

12. The computer program product of claim 11, wherein said first social media content comprises a social media message from the first linked node.

13. The computer program product of claim 11, wherein the relationship comprises a link strength of the second linked node relative to the first linked node.

14. The computer program product of claim 11, said method further comprising:
further in response to said receiving, the processor automatically adjusting a weight of a third linked node of the plurality of linked nodes to a lesser extent than said automatically adjusting the weight of the second linked node, based on a lesser relationship between the third linked node and the first linked node than the relationship between the second linked node and the first linked node.

\* \* \* \* \*